(12) United States Patent
Onda

(10) Patent No.: US 6,995,927 B2
(45) Date of Patent: Feb. 7, 2006

(54) LENS POSITION ADJUSTMENT MECHANISM AND CAMERA EQUIPPED WITH THE MECHANISM

(75) Inventor: Kazuhiko Onda, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/899,015

(22) Filed: Jul. 27, 2004

(65) Prior Publication Data

US 2005/0024741 A1 Feb. 3, 2005

(30) Foreign Application Priority Data

Jul. 28, 2003 (JP) .............................. 2003-281336

(51) Int. Cl.
G02B 15/14 (2006.01)
G02B 7/02 (2006.01)
G03B 17/00 (2006.01)

(52) U.S. Cl. ...................... 359/699; 359/700; 359/701; 359/823; 396/72

(58) Field of Classification Search ................ 359/699, 359/694, 700, 701, 704, 823; 396/72, 82
See application file for complete search history.

(56) References Cited

U.S. PATENT DOCUMENTS

| 5,268,794 | A | * | 12/1993 | Chan | 359/699 |
| 5,764,312 | A | * | 6/1998 | Okumura | 348/785 |
| 5,831,777 | A | * | 11/1998 | Iwasa | 359/826 |
| 5,870,232 | A | * | 2/1999 | Tsuji et al. | 359/700 |
| 6,741,400 | B2 | * | 5/2004 | DiRisio | 359/699 |
| 2002/0141080 | A1 | | 10/2002 | Onda | |

FOREIGN PATENT DOCUMENTS

JP 2002-286993 10/2002

* cited by examiner

*Primary Examiner*—Loha Ben
(74) *Attorney, Agent, or Firm*—Young & Thompson

(57) ABSTRACT

An adjustment mechanism for adjusting an axial position of one lens component relative to other lens components of an optical lens system comprises a lens holding frame mounting the lens component that has a peripheral locating seat and a cylinder holding and allowing the lens holding frame to rotate about and move along the optical axis that has an axial position selective collar with a flight of stairs. The lens holding frame is rotated to bring the locating seat into abutment selectively against the stairs, so as thereby to position the lens component mounted in the lens holding frame at a desired axial n with respect to the remaining lens components.

7 Claims, 7 Drawing Sheets

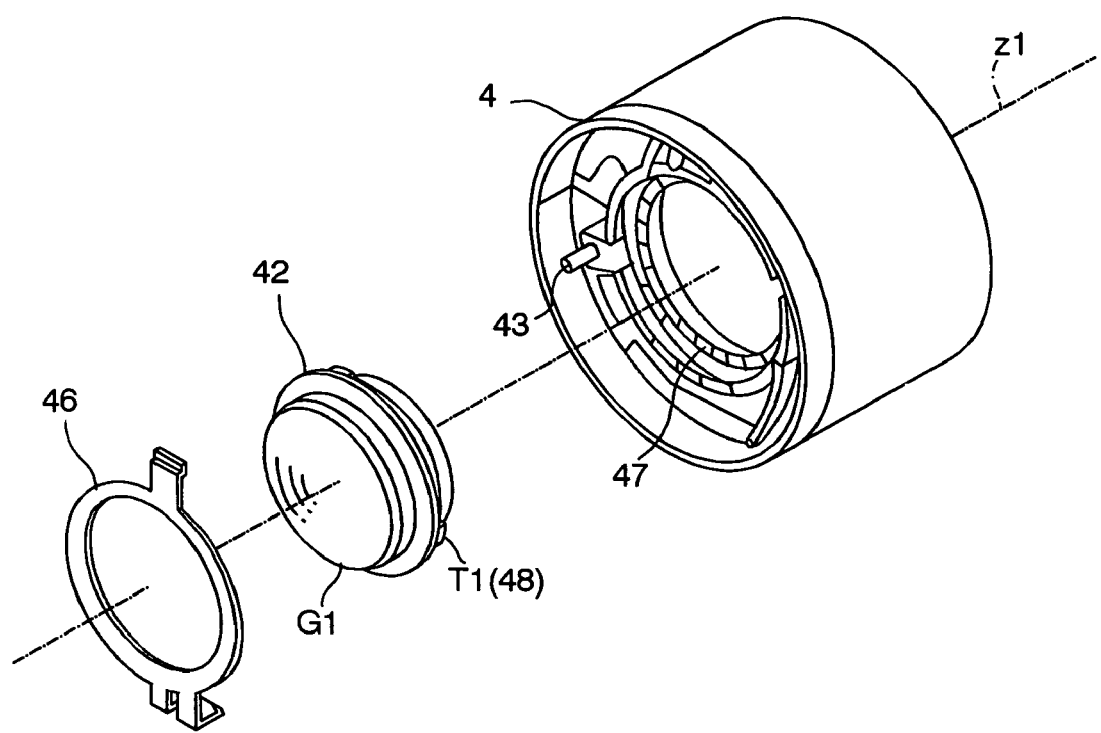

LENS POSITION ADJUSTMENT MECHANISM AND CAMERA EQUIPPED WITH THE MECHANISM

BACKGROUND OF THE INVENTION

1. Field of the Invention

The present invention relates to a mechanism for adjusting a distance or a relative position between lens groups of an optical lens system and a camera equipped with the lens position adjustment mechanism.

2. Description of Related Art

Generally, in order for taking lens systems comprising a plurality of lens groups used for photographic camera such as conventional cameras for use with silver films and digital cameras to exhibit full optical performance, it is essential that lens groups of the taking lens system are precisely arranged with predetermined distances. If components of a taking lens, the lens groups and associated structural parts are manufactured as precisely meeting the dimensional specifications, the lens groups can be precisely arranged with the specified distances under ordinary circumstances when these components are assembled to a taking lens. However, because the components have manufacturing errors and variations as a matter of fact, it is necessary to adjust the manufacturing errors and variations in some way or other during assembling them to the taking lens so as thereby to relieve the manufacturing errors and variations collectively.

It is conventional to relieve the manufacturing errors and variations by using adjuster rings to fine adjust distances between lens groups. The adjuster ring is interposed between a lens holder in which a lens group is fixedly held and a lens barrel enclosing the lens holder, then the lens holder is continuously shifted back and forth with respect to the adjuster ring for a fine adjustment of axial distances by the trial-and-error technique. One of such conventional ways of fine adjustment of axial distances between lens groups is disclosed in, for example, Japanese Unexamined Patent Publication No. 2002-286993.

Recent marked development of compact cameras strongly presses a demand for more compactness as well as a demand for a reduction in production cost. However, the conventional distance adjustment mechanism comprises a number of mechanical parts including adjuster rings and adjusting screws and requires a long time for the distance adjustment during assembling the taking lens while makes it possible to accomplish a fine adjustment of distances.

SUMMARY OF THE INVENTION

It is therefore an object of the present invention to provide an adjustment mechanism for fine adjusting axial distances or relative positions between lens groups of an optical lens system that enables easy adjustment and a camera equipped with the adjustment mechanism.

The foregoing object of the present invention is accomplished by an adjustment mechanism incorporated in an optical lens system comprising a plurality of lens groups in a lens barrel for adjusting an axial distance or a relative axial position between one of the lens groups relative to another lens group of the optical lens system and a camera equipped with the adjustment mechanism. The adjustment mechanism comprises an annular lens holding frame for fixedly holding the one lens group therein, a cylinder forming a part of the lens barrel that holds the one annular lens holding frame so as to allow the annular lens holding frame to shift in a direction of an optical axis of the optical lens system (which is hereafter referred to as an axial direction) and to rotate about the optical axis of the optical lens system, and position adjustment means provided between the annular lens holding frame and the cylinder for gradually varying an axial position of the annular lens holding frame relative to the cylinder. The position adjustment means comprises axial position selective means such as a flight of stairs that extends circumferentially within the cylinder and gradually varies stepwise in the axial direction, and locating means formed on an outer periphery of the annular lens holding frame for defining a reference position against which the stairs are selectively abutted to locate the annular lens holding frame at a selected axial position relative to the cylinder when the annular lens holding frame is rotated so as thereby to adjust an axial distance or a relative axial position of the one lens group relative to another lens group of the optical lens system.

The adjustment mechanism having the above configuration allows the lens group held in the annular lens holding frame to be repeatedly shifted back and forth in the optical direction following continuous rotation of the annular lens holding frame in the cylinder. This configuration makes it quite easy to find a desired axial position of one lens group of an optical lens group relative to another lens group of the optical lens system. Furthermore, the adjustment mechanism having the above configuration can comprise a reduced number of mechanical parts and requires only a short time for distance or position adjustment These advantages of the adjustment mechanism leads to more compactness of a camera as well as a reduction in production cost of a camera.

The adjustment mechanism preferably further comprises bias means for pressing the annular lens holding frame against the cylinder through the distance or position adjustment means. This is more advantageous to easy position adjustment.

The locating means preferably comprises a seat projecting laterally from an outer periphery of the annular lens holding frame and having an axial height greater than an overall axial interval between a top and a bottom stair of the flight of stairs. The locating means may comprise a plurality, preferably three, of locating seats arranged at regular angular intervals. In this instance, the axial position selective means comprises the same number of the flights of stairs arranged at regular angular intervals. Each adjacent two of the flights of stars are bridged by a slop way. Since, even if it ends in failure to find a desired axial position of one lens group of the optical lens system, the annular lens holding frame can be further rotated continuously until a best axial position is found, the relative axial position adjustment is achieved quite easily and conveniently.

The cylinder may hold the annular lens holding frame so as to allow the annular lens holding frame to move in a direction perpendicular to the optical axis. This configuration makes it easy to adjust eccentricity of the lens group held in the annular lens holding frame relative to the optical axis of the optical lens system.

BRIEF DESCRIPTION OF THE DRAWINGS

The above and other objects and features of the present invention will be clearly understood from the following detailed description when read with reference to the accompanying drawings, wherein the same numeral numbers have been used to denote same or similar parts or mechanisms throughout the drawings and in which:

FIG. 4 is an exploded perspective view of the adjustment mechanism;

DETAILED DESCRIPTION OF THE PREFERRED EMBODIMENTS

In the following description, the term "front" as used herein shall mean and refer to the object side (the left side of drawing) with respect to the optical lens system, and the term "rear" as used herein shall mean and refer to the image side (the right side of drawing) with respect to the optical lens system.

Figure 1:
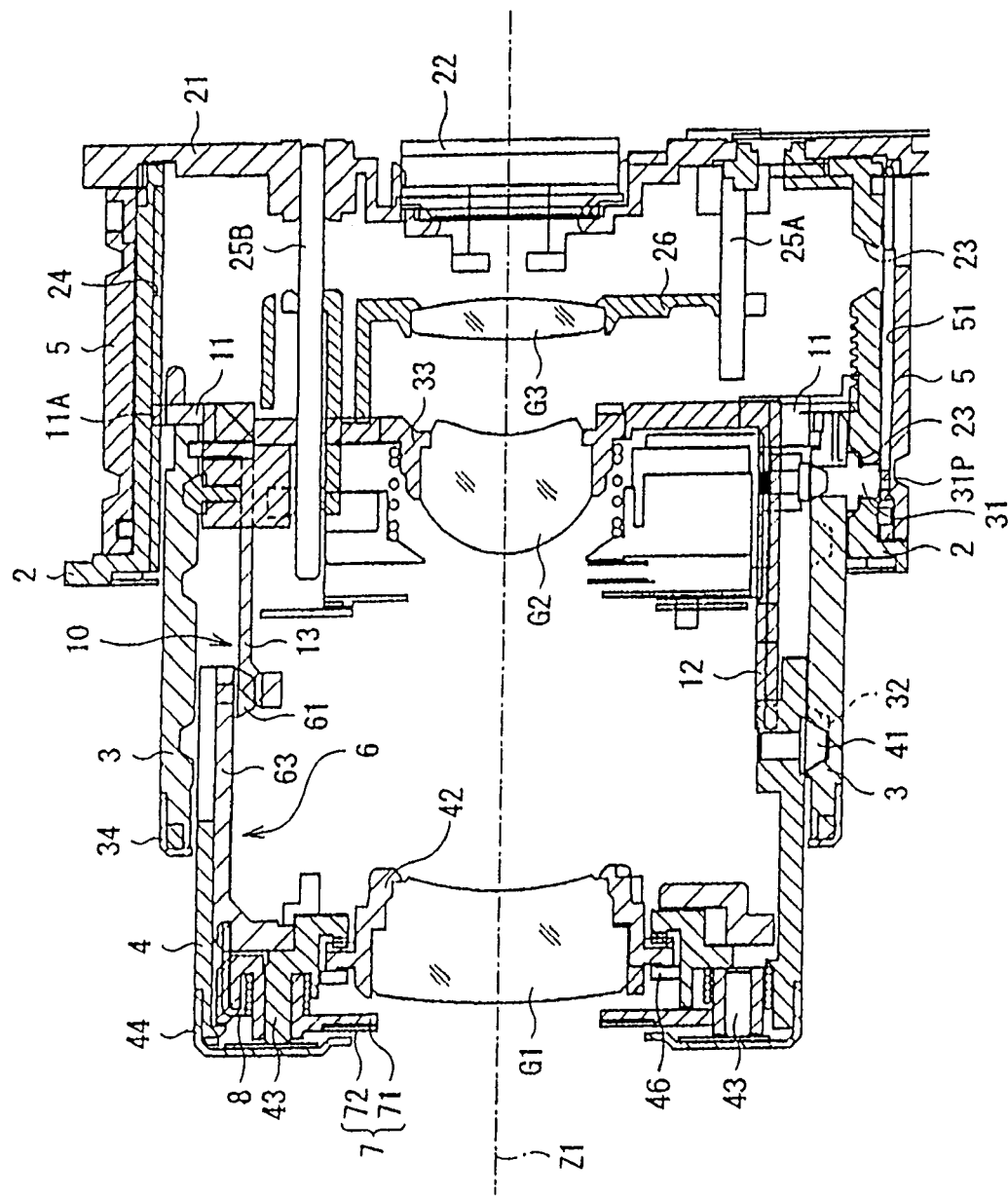
FIG. 1 is a longitudinal sectional view of a collapsible lens barrel equipped with an adjustment mechanism according to a preferred embodiment of the present invention in which the collapsible lens barrel is in its extended position.
Figure 2:
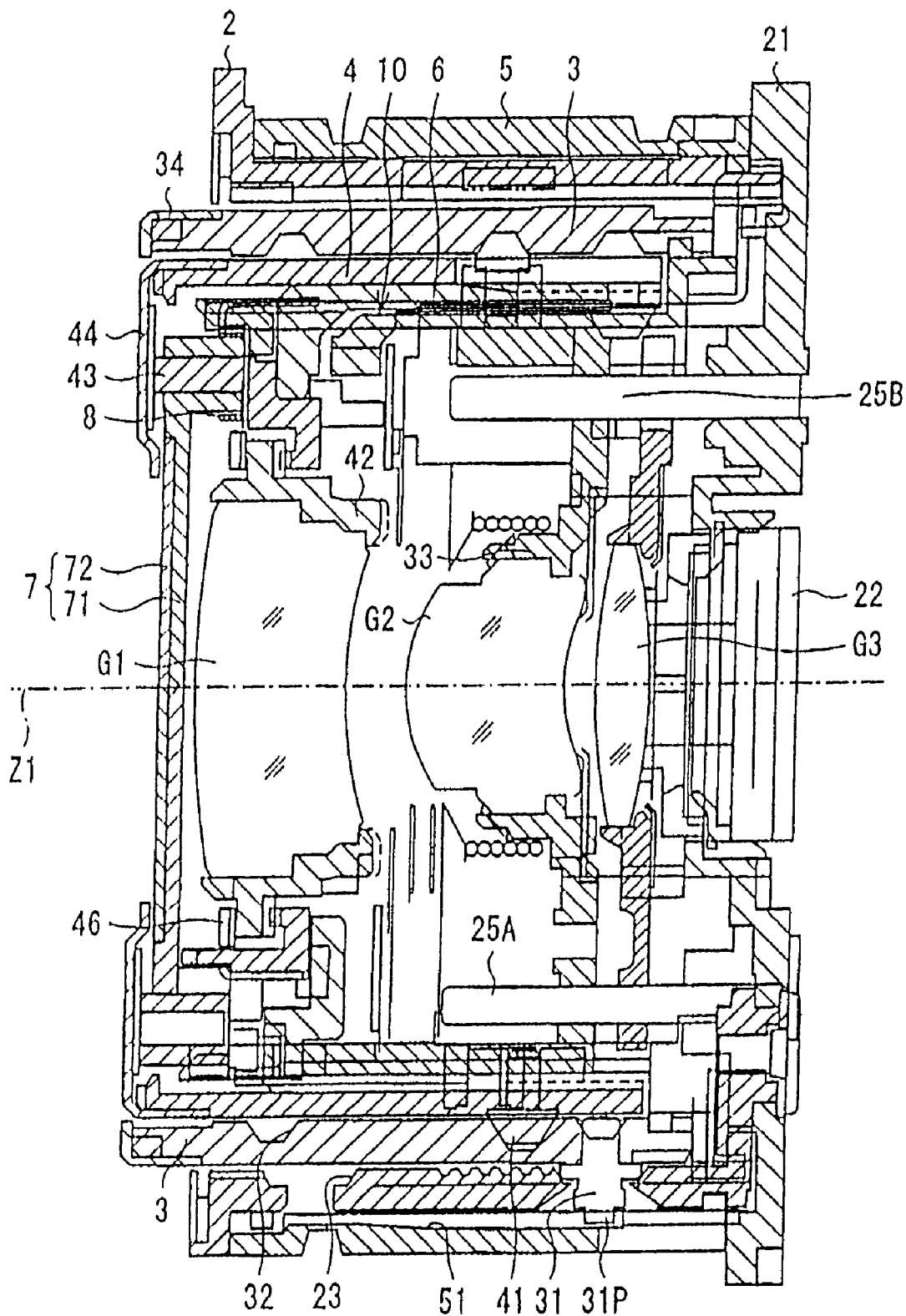
FIG. 2 is a longitudinal sectional view of the collapsible lens barrel in which the collapsible lens barrel is in its retracted position.
Figure 3:
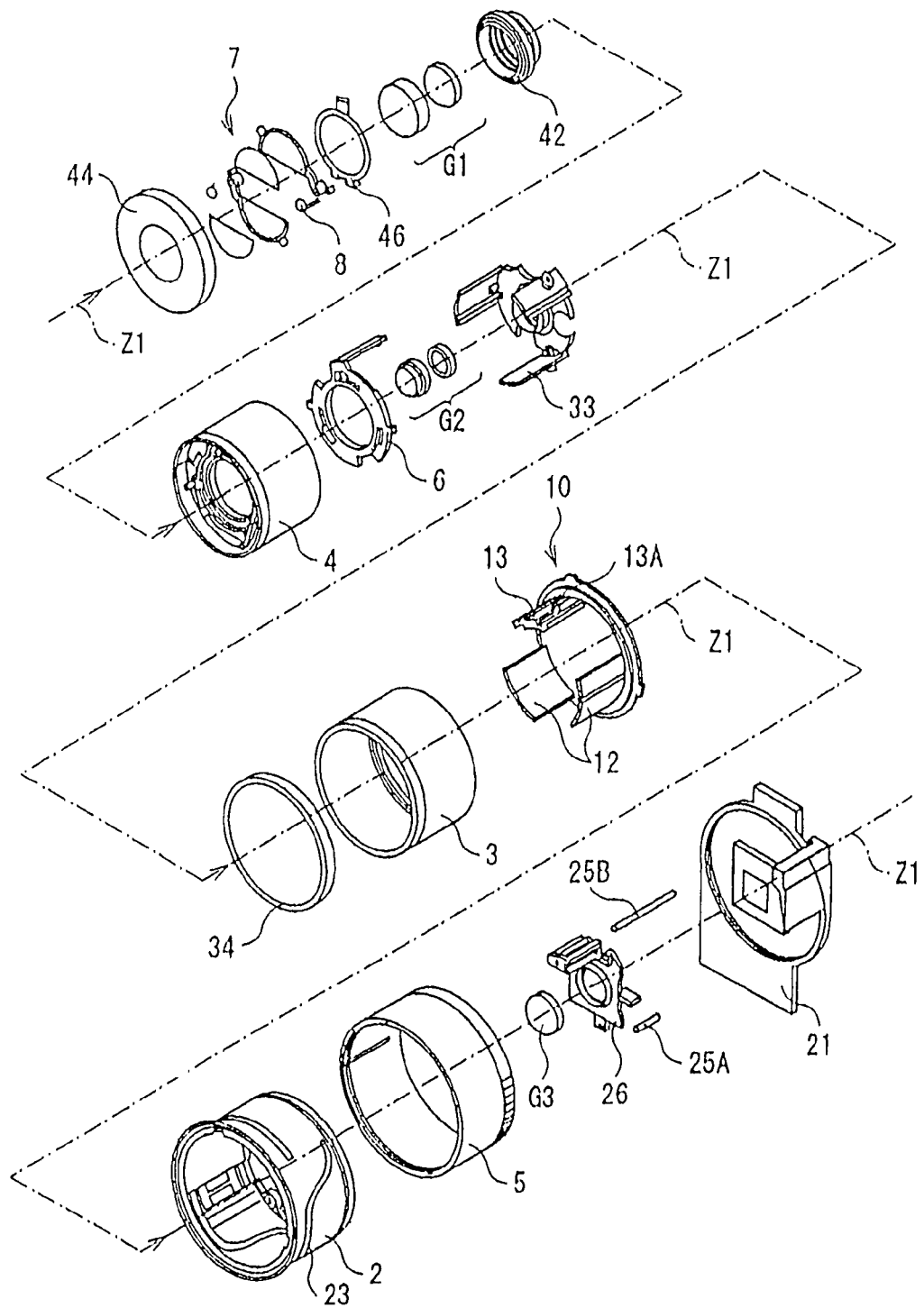
FIG. 3 is an exploded perspective view of the collapsible lens barrel.

Referring to the drawings in detail and, in particular, to FIGS. 1 to 3 showing a taking lens which includes an optical lens system, an adjustment mechanism according to a preferred embodiment of the present invention and a lens protection mechanism all of which are installed in a collapsible lens barrel, the collapsible lens barrel is capable of changing its position between an extended position shown in FIG. 1 and a retracted position shown in FIG. 2. The optical lens system, that has an optical axis Z1, comprises in order from the object side to the image side a first lens group G1 fixedly held in an first annular lens holding frame 42, a second lens group G2, operative as a zooming lens, fixedly held in an second annular lens holding frame 33 and a third lens group G3, operative as a focusing lens, fixedly held in an third annular lens holding frame 26. These lens groups G1, G2 and G3 are relatively movable along the optical axis Z1 with respect to one another. The adjustment mechanism, which is described in detail later, is provided for adjusting a relative axial position of the first lens group G1 of the optical lens system, in other words an axial distance of the first lens group with respect to the second and/or third lens groups G2 and G3. The lens protection mechanism, which is described in detail later, includes a lens barrier device 7 installed on the object side of the optical lens system in the collapsible lens barrel and capable of changing between an open position where it opens or uncovers the optical lens system, specifically the first lens group G1 as shown in FIG. 1 and a closed position where it covers the optical lens system, specifically the first lens group G1 for protection as shown in FIG. 2 following movement of the collapsible lens barrel between the extended position and the retracted position.

The collapsible lens barrel comprises a stationary cylinder 2 fixedly mounted to a camera body (not shown), an intermediate cylinder 3 movable relatively to the stationary cylinder 2 along the optical axis Z1, and an inner cylinder 4 movable relatively to both stationary and intermediate cylinders 2 and 3 along the optical axis Z1. The inner cylinder 4 has a stepped inner annular collar 47 formed away rearward from the front end of the inner cylinder 4 that forms a part of the adjustment mechanism as will be described later. The collapsible lens barrel is mounted to a mounting ring 21 forming a part of the camera body through the stationary cylinder 2. The mounting ring 21 is provided with a pair of guide shafts 25A and 25B diametrically separated from each other and extending forward therefrom and is equipped with an electronic image pick-up device such as a charge coupled device (CCD) 22 disposed as one of camera components on the optical axis Z1. The CCD 22 converts an optical image formed thereon by the optical lens system into electric signals as is well known in the art.

The stationary cylinder 2 has a cam slot 23 penetrating and running helically through a cylinder wall and an axial guide groove 24 formed in an inner peripheral surface thereof and extending in a direction in line with the optical axis Z1. The intermediate cylinder 3 is provided with a radial cam follower 31 that extends radially from the outer peripheral surface thereof and is received for slide movement in the cam slot 23 of the stationary cylinder 2. The intermediate cylinder 3 is further provided with a helical cam groove 32 formed in the outer peripheral surface thereof With this configuration, the intermediate cylinder 3 is held steadily in the stationary cylinder 2 so as to move back and forth in the stationary cylinder 2 when it rotates relatively to the stationary cylinder 2. The cam follower 31 at its top is provided with a guide pin 31P.

The collapsible lens barrel further comprises a drive cylinder 5 that is mounted on the stationary cylinder 2 so as to be allowed to rotate about the optical axis Z1 but to be prevented from moving along the optical axis Z1, a barrier drive ring 6 that forms a part of the lens barrier device 7 and is mounted for rotation in the inner movable cylinder 4, and a ring-shaped key member 10. The drive cylinder 5 has an axial guide groove 51 formed in an inner peripheral surface thereof. The guide pin 31P of the cam follower 31 is received for slide movement in the axial guide groove 51. The lens drive cylindrical 5 is driven to rotate, manually or by a power driving device such as an electric motor (not shown). When the drive cylinder 5 rotates in one direction about the optical axis Z1, the intermediate cylinder 3 is forced to rotate in the same direction through sliding engagement between the guide pin 31P and the guide groove 51 and simultaneously to move along the optical axis Z1 forward or rearward through sliding engagement between the cam follower 31 of the intermediate cylinder 3 and the cam slot 23 of the stationary cylinder 2.

The inner cylinder 4 at its rear end portion is provided with a radial cam follower 41 that extends radially outward and is received for slide movement in the helical cam groove 32 of the inner cylinder 3. Therefore, when the intermediate cylinder 3 rotates, the inner cylinder 4 is forced along the optical axis Z1 through slide engagement between the helical cam groove 32 and the cam follower 41 to shift the first annular lens holding frame 42, and hence the first lens group G1. The inner cylinder 4 movably receives the first annular lens holding frame 42 fixedly mounting the first lens group G1 therein. An annular retaining spring 46 bears down the first annular lens holding frame 42 against the stepped inner annular collar 47 of the inner cylinder 4. An ornamental decorative annular ring 44 having an aperture similar in diameter to an outer diameter of the first lens group G1 is attached to the front end of the inner cylinder 4.

The intermediate cylinder 3 holds the second annular lens holding frame 33 fixedly mounting the second lens group G2 therein so that the second annular lens holding frame 33 is moved along the optical axis Z1 for zooming when the intermediate cylinder 3 moves back and forth. Axial movement of the second annular lens holding frame 33 is guided through slide engagement between an axial guide groove (not shown) formed in the inner cylinder 4 and a guide pin (not shown) extending from the second annular lens holding frame 33 and by the guide shaft 25B extending from the mounting ring 21. The third annular lens holding frame 26 fixedly mounting the third lens group G3 arranged on the rear side of the second lens group G2 is supported for slide movement by the guide shafts 25A and 25B and is moved along the optical axis Z1 for zooming by a focusing motor (not shown). An annular ornamental ring 34 is attached to a front end of the intermediate 3.

Referring to FIG. 4 showing the adjustment mechanism according to an embodiment of the present invention in detail, the adjustment mechanism comprises axial position selective means, specifically the stepped inner annular collar 47, formed away rearward from the front end of the inner cylinder 4, locating means, specifically locating seats T1 to T3 (see FIGS. 6A and 6B) in the form of lateral boss, defining working or reference faces 48 thereon that extend laterally from the first annular lens holding frame 42 so as to face the stepped inner annular collar 47 of the inner cylinder 4, and bias means, specifically the annular retaining spring 46 as a resilient bias means, for pressing the locating seats T1 to T3 of the first annular lens holding frame 42 against the stepped inner annular collar 47 of the inner cylinder 4.

Figure 5A:
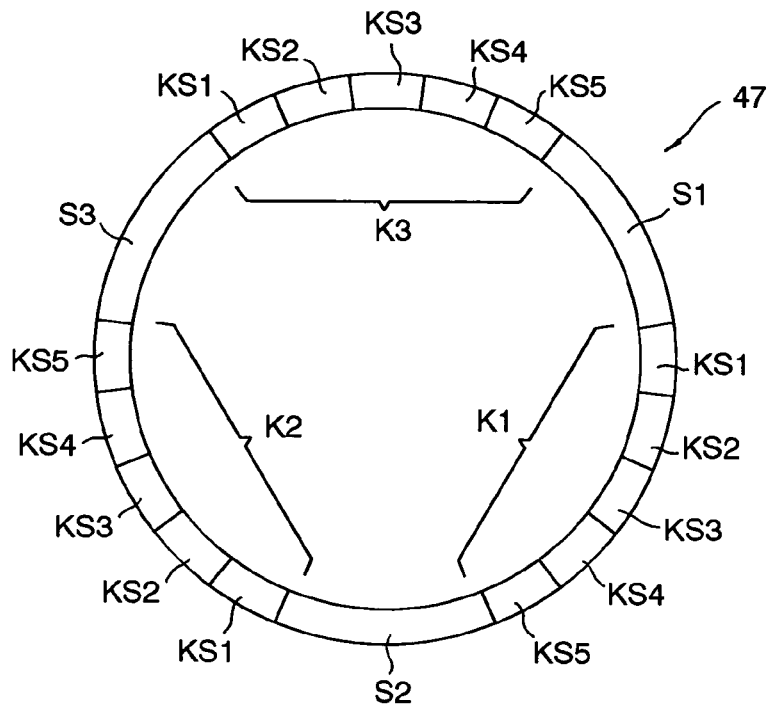
FIG. 5A is an enlarged front view of a stepped annular collar of relative axial position adjusting means formed in a cylinder forming a part of the lens barrel.
Figure 5B:
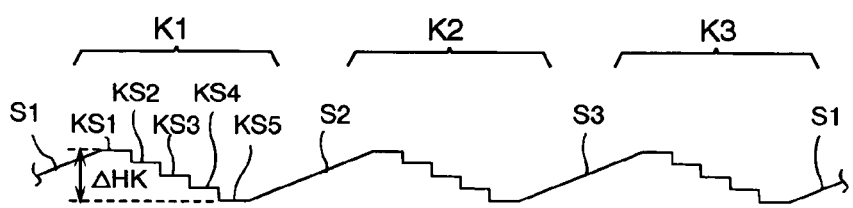
FIG. 5B is a diagrammatic view showing a profile of a flight of stairs forming the stepped annular collar by way of example.
Figure 5C:
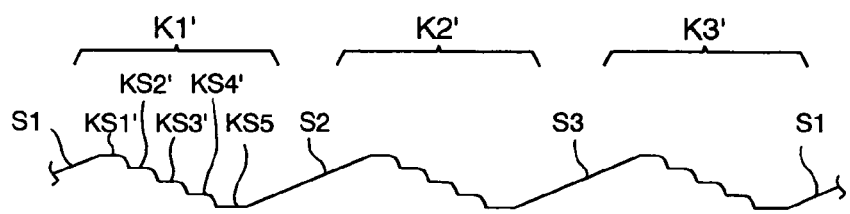
FIG. 5C is a diagrammatic view showing a profile of a flight of stairs of the stepped annular collar by way of another example.

Referring to FIGS. 5A to 5C showing the stepped inner annular collar 47 in fine detail, the stepped inner annular collar 47, which works as axial position selective means, has a front face rising and falling in a direction in line with the optical axis Z1. Specifically, the stepped inner annular collar 47 at its front surface comprises three circumferential stepped wall segments K1, K2 and K3 that are identical in configuration with one another and are arranged with regular angular intervals and slope ways S1, S2 and S3, one between each adjacent circumferential stepped wall segments. As shown in detail in FIG. 5B, each of the circumferential stepped wall segments K1, K2 and K3 comprises a flight of five stairs KS1 to KS5. The flight of stairs, desirably but not restrictedly, comprises stairsteps having an equal circumferential breadth and an equal axial rise or step in light of easy position adjustment. As shown in FIG. 5B, the circumferential stepped wall segment has an overall axial interval ΔHK that is defined between the top stairtread KS1 closest to the locating seats T1 to T3 of the first annular lens holding frame 42 and the bottom stairtread SK5 farthest from the locating seats T1 to T3 of the first annular lens holding frame 42. The top stairtread SK1 of one circumferential stepped wall segment and the bottom stairtread SK5 of an neighboring circumferential stepped wall segment are connected by the slope way S1, S2 or S3. The circumferential stepped wall segment K1, K2, K3 may comprise flat stairtreads KS1 to KS5 connected by upright risers as shown in FIG. 5B. Otherwise, as shown in FIG. 5C, the stepped inner annular collar 47 may comprise three circumferential stepped wall segments K101, K102, K103 comprising slightly curved stairtreads KS1' to KS5' connected by slightly curved risers and slope ways S2.

Figure 6A:
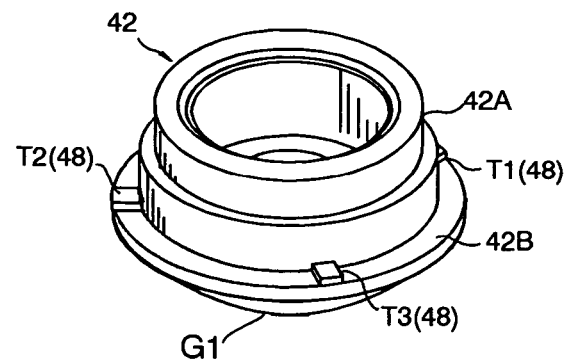
FIG. 6A is a perspective view of an annular lens holding frame with locating means of the adjusting means formed thereon.
Figure 6B:
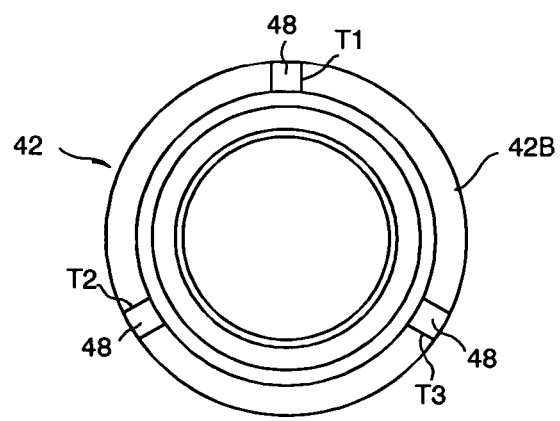
FIG. 6B is a rear view of the annular lens holding frame.
Figure 6C:
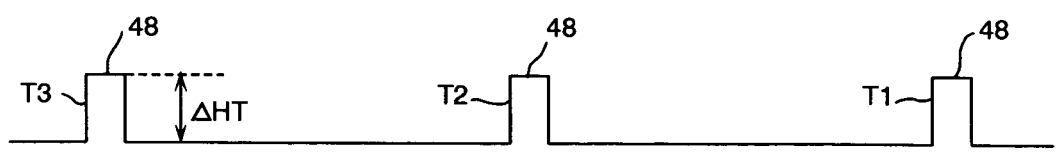
FIG. 6C is a diagrammatic view showing a profile of the locating means.

Referring to FIGS. 6A to 6C showing the first annular lens holding frame 42 in detail, the first annular lens holding frame 42 comprises a cylindrical shell 42A having an outer diameter slightly smaller than an inner diameter of the stepped inner annular collar 47 of the inner cylinder 4 and a front peripheral flange 42B having an outer diameter greater than the inner diameter of the stepped inner annular collar 47 of the inner cylinder 4. The front peripheral flange 42B is provided with three locating seats T1 to T3 defining the working or reference faces 48 thereon, respectively. The locating seats T1 to T3 have the same axial seat height ΔHT as one another and are arranged with regular angular intervals in the circumferential direction as shown in FIG. 6C. The axial seat height ΔHT is set greater than the overall intervals ΔHK of the circumferential stepped wall segments K1 to K3 of the stepped inner annular collar 47 of the inner cylinder 4. This dimensional configuration makes it possible to perform adjustment taking fill advantages of rises and falls of the circumferential stepped wall segments K1 to K3 since, even when the working or reference faces 48 of the locating seats T1 to T3 are in abutment with the bottom stairs SK5 of the circumferential stepped wall segments K1, K2 and K3, respectively, the major portion of the front peripheral flange 42B of the first annular lens holding frame 42 is kept away from any part of the stepped inner annular collar 47.

When the first annular lens holding frame 42 is rotated relative to the inner cylinder 4, the locating seats T1 to T3 at their the working or reference faces 48 are brought into abutment against the stairs of the circumferential stepped wall segments K1, K2 and K3, in order from the top stairs SK1 to the bottom stairs SK5, with the consequence that the first annular lens holding frame 42 is gradually shifted in axial position along the optical axis Z1.

In this instance, because the first annular lens holding frame 42 is shaped as comprising the cylindrical shell 42A having an outer diameter smaller than an inner diameter of the stepped inner annular collar 47 of the inner cylinder 4 and the peripheral flange 42B having an outer diameter greater than the inner diameter of the stepped inner annular collar 47 of the inner cylinder 4, there is provide a slight clearance between the cylindrical shell 42A of the first annular lens holding frame 42 and the stepped inner annular collar 47 of the inner cylinder 4. This clearance allows the first annular lens holding frame 42 to move slightly in a direction perpendicular to the optical axis Z1 for eccentric adjustment of the first lens group G1 mounted in the first annular lens holding frame 42.

Figure 7:
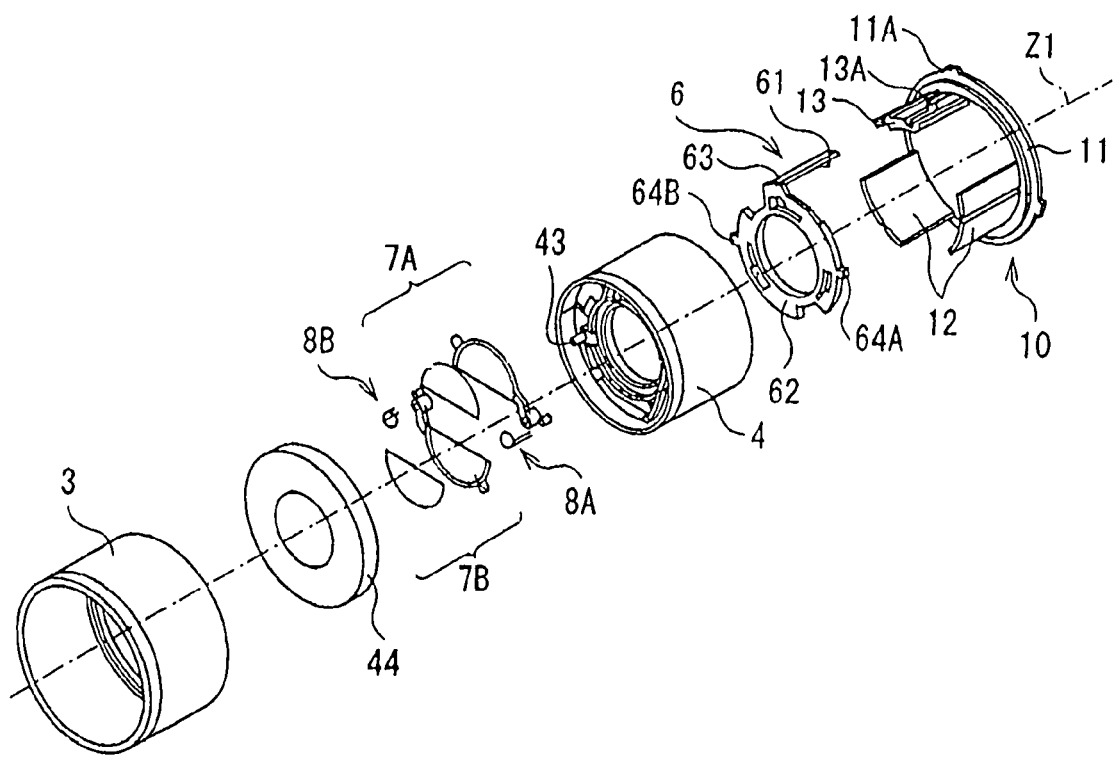
FIG. 7 is an exploded perspective view of a lens protection mechanism installed in the collapsible lens barrel.

FIG. 7 shows the lens barrier device 7 in detail. The lens barrier device 7 is disposed in front of the optical lens system comprising the first to third lens groups G1–G3 so as to change between the open position where it uncovers the optical lens system when the lens barrier is in the extended position and the closed position where it covers the optical lens system when the lens barrier is in the retracted position The lens barrier device 7 is divided into two, or upper and lower, barrier means 7A and 7B each of which comprises a disk-shaped barrier blade made up two mating barrier blade halves and is pivotally mounted on the pivotal shaft 43 of the inner cylinder 4 and is operationally connected to the barrier drive ring 6 through neutralizing bias means 8A and 8B. The neutralizing bias means 8A and 8B, which comprise, for example, coil springs, operate so as to maintain the barrier means 7A and 7B in a fixed position relative to the barrier drive ring 6 during movement to the open position and the closed position and, however, allows the barrier means 7A and 7B in the open position or the closed position to rotate toward the closed position or the open position when an accidental external load is unintentionally applied to the upper and lower barrier means 7A and 7B.

The ring-shaped key member 10 comprises an annular ring 11, an radial key 11A extending radially outward from the annular ring 11 and three axial flaps 12 and 13 arranged with regular angular intervals in a circumferential direction and extending axially forward from the annular ring 11. The axial flap 13 of the ring-shaped key member 10 has a cam groove 13A formed on an outer peripheral surface thereof. The annular ring 11 is received for relative rotation in the intermediate cylinder 3. The radial key 11A engages with the axial guide groove 24 of the stationary cylinder 2 for axial slide movement The axial flap 13 of the ring-shaped key member 10 has a cam groove 13A formed on a surface thereof.

The barrier drive ring 6 is mounted in the inner cylinder 4 so as to rotate relatively to the inner cylinder 4 and, however, to be immobile along the optical axis Z1 with respect to the inner cylinder 4. The barrier drive ring 6, which is desirably formed as one integral piece, comprises a ring 62, a cam follower arm 63 extending award along the optical axis Z1 from the periphery of the ring 62 and having a cam follower 61 extending radially inward from the cam follower arm 63, and the radial projections 64A and 64B extending outward from the periphery of the ring 62 and disposed in diametrically opposite positions. The cam follower 61 is received for slide movement in the cam groove 13A of the axial flap 13 of the ring-shaped key device 10.

The ring-shaped key member 10 and the barrier drive ring 6 are operationally coupled by the cam groove 13A of the axial flap 13 of the ring-shaped key member 10 and the cam follower 61 of the cam follower arm 63 of the barrier drive ring 6 so that, when the ring-shaped key member 10 moves back and forth along the optical axis Z1 following movement of the collapsible lens barrel between the retracted position an the extended position, the ring-shaped key member 10 moves along the optical axis Z1 relative to the barrier drive ring 6 and simultaneously rotates the barrier drive ring 6 in opposite directions through the slide engagement the cam follower 61 in the cam groove 13A. The rotational movement of the barrier drive ring 6 causes the barrier means 7A and 7B operationally connected to the barrier drive ring 6 through the neutralizing bias means 8A and 8B, respectively, to open and close.

In distance or position adjustment of the optical lens system installed in the collapsible lens barrel, the optical lens system is adjusted so as to sharply focus on an object at infinity by gradually shifting the first lens group G1 back and forth along the optical axis Z1. For this adjustment, the third lens group G3 is located in a home position that is detected by use of an optical sensor well known in the art and then shifted to a given position for the sharp focus at infinity from the home position. The position shift of the third lens group G3 is achieved by controlling a number of pulses representative of a distance from the home position. Subsequently, the first annular lens holding frame 42, that is borne down against the stepped inner annular collar 47 of the inner cylinder 4, is rotated step-by-step in one direction to identify find one stairs of the five stairs KS1 to SK5 of the circumferential stepped wall segment K1, K2, K3 are seated on the locating seat T1 to T3, respectively, at which end the optical lens system provides best focus on an object at infinity. In this instance, when the first annular lens holding frame 42 is continuously turned, the working or reference face 48 of each locating seat T1, T2, T3 is always brought into abutment against any one of the circumferential stepped wall segments K1 to K3 of the stepped inner annular collar 47 of the inner cylinder 4 in this order. When the optical lens system provides best focus, the first annular lens holding frame 42 is stopped so as thereby to keep the identified stairs remaining seated on the locating seat T1 to T3. As a result the third lens group G1 is adjusted in position relative to the inner cylinder 4, i.e. at desired distances relative to the remaining lens groups G2 and G3. If it ends in failure to find best focus of the optical lens system, the first annular lens holding frame 42 is further turned in the same direction until best focus of the optical lens system is found. Subsequently, the first annular lens holding frame 42 is moved in a plane perpendicular to the optical axis Z1 with the selected stairs of the five stairs KS1 to SK5 of the circumferential stepped wall segment K1, K2, K3 remaining seated on the locating seat T1 to T3, respectively, so as thereby to perform eccentricity adjustment. Subsequently, if necessary, the third lens group G3 may be shifted along the optical axis Z1 for fine focus adjustment. Finally, the second lens group G2 is shifted back and forth along the optical axis Z1 to cause the optical lens system to zoom in and out in order to check out whether the optical lens system provides a sharp image over the range of from a wide-angle end to a telephoto end. In this instance, it is adequate to shift the third lens group G3 back and forth within a given tolerance so that the optical lens system provides best focus.

After completion of the distance adjustment of the lens groups G1 and G3 in this way, the first annular lens holding frame 42 and the stepped inner annular collar 47, and hence the inner cylinder 4, are firmly joined together by filling, for example, a UV cure adhesive in a gap therebetween.

In extending and retracting operation of the collapsible lens barrel, when tuning on a power switch of the camera to activate the drive motor for extending the collapsible lens barrel, the operating cylinder 5 is rotated about the optical axis Z1 in the normal direction. During a continuous rotation of the lens operating cylinder 5, the intermediate cylinder 3 is forcibly rotated in the normal direction through slide engagement between the axial guide groove 51 of the lens operating cylinder 5 and the guide pin 31P of the cam follower 31 of the intermediate cylinder 3 and is simultaneously moved straight forward according to the configuration of the cam slot 23 through the slide engagement of the cam follower 31 with the cam slot 23 of the stationary outer cylinder 2 resulting from the rotation thereof. At the same time, during the continuous rotation of the lens operating cylinder 5, the ring-shaped key device 10 that is coupled to the stationary outer cylinder 2 through slide engagement between the axial guide groove 24 of the stationary outer cylinder 2 and the radial projection 11A extending from the key ring 11 of the ring-shaped key device 10 and is rotatable relatively to the intermediate cylinder 3 is move straight forward without rotating regardless of the rotation of the intermediate cylinder 3. The forward movement of the intermediate cylinder 3 resulting from the rotation in the normal direction thereof causes the inner cylinder 4 to extend forward through slide engagement between the helical cam groove 32 of the intermediate cylinder 3 and the radial cam follower 41 of the inner cylinder 4. In this instance, sine the ring-shaped key device 10 that is prevented from rotating is in engagement with the rear end of the inner cylinder 4 at the front ends of the axial flaps 12, the inner cylinder 4 is allowed to move straight along the optical axis Z1 without rotating about the optical axis Z1. By this means, extension of the collapsible lens barrel is completed.

After making a photograph, when the drive motor is activated to rotate in a reverse direction so as thereby to rotate the operating cylinder 5 in a reverse direction. The reverse rotation of the operating cylinder 5 causes the intermediate cylinder 3 to rotate about the optical axis Z1 in the reverse direction. The intermediate cylinder 3 is moved straight rearward along the optical axis Z1 according to the configuration of the cam slot 23 resulting from a continuous rotation of the operating cylinder 5 in the reverse direction. As a result, the ring-shaped key device 10 is moved straight rearward along the optical axis Z1 without being rotated. The continuous rotation in the reverse direction and rearward movement of the intermediate cylinder 3 causes the inner cylinder 4 to move straight rearward along the optical axis Z1 through slide engagement between the radial cam follower 41 of the inner cylinder 4 and the helical cam groove 32 of the intermediate cylinder 3. During the rearward movement, the inner cylinder 4 is prevented from rotating. When the intermediate cylinder 3 and the inner movable cylinder 4 reach the retracted position shown in FIG. 2, the drive motor is deactivated. By this means, retraction of the collapsible lens barrel is completed.

As described above, according to the adjustment mechanism for adjusting a distance of the first lens group G1 relative to the remaining lens groups G2 and G3 of the optical lens system, the adjusting mechanism provided between the inner cylinder forming a part of the lens barrel and the first annular lens holding frame 42 fixedly mounting the first lens group G1 that is rotatable about and movable along the optical axis of the optical lens system comprises axial position selective means, specifically the stepped inner annular collar 47 having the circumferential rises and falls, formed integrally with the inner cylinder 4 and locating means, specifically the locating seats T1 to T3 defining working or reference faces 48 thereon, extending laterally from the first annular lens holding frame 42 which are disposed so as to face each other. With this configuration, the first lens group G1 is easily positioned at desired distances relative to the remaining lens groups G2 and G3 by simply rotating the first annular lens holding frame 42. Therefore, it is made quite easy to find a desired axial position of the first lens group G1 of the optical lens system in a short time without incorporating conventional structural parts including adjuster rings and adjusting screws. In addition, the iteration structure of circumferential stepped wall segments comprising flights of stairs realizes significantly convenient distance or position adjustment.

The adjustment mechanism presses the annular lens holding frame 42 against the inner cylinder 4 through the distance or position adjustment means by the bias means such as the annular retaining spring 46. Therefore, the annular lens holding frame 42 can be rotated keeping the locating seats T1 to T3 remaining abutted against the stepped inner annular collar 47 of the inner cylinder 4. This leads to easy and convenient adjustment.

The configuration in which the inner cylinder 4 holds the annular lens holding frame 42 so as to allow the annular lens holding frame 42 to move in a direction perpendicular to the optical axis Z1 makes it easy and convenient to adjust eccentricity of the first lens group G1 relative to the optical axis Z1 of the optical lens system.

The distance or position adjustment mechanism has been described as comprising three axial position selective means such as circumferential stepped wall segments and three locating means such as laterally projecting seats, the number of these axial position selective means and locating means is not bounded to three. Further, the number of stairs of the circumferential stepped wall segment is not limited to five.

Although the present invention has been described as applied to a digital camera equipped with a zoom lens by way of example, it can be realized in various conventional cameras equipped with or not equipped with zoom lenses and it will be appreciated that variants and other embodiments can be effected by person of ordinary skill in the art without departing from the scope of the invention.

What is claimed is:

1. An adjustment mechanism for an optical lens system comprising a plurality of lens groups installed in a lens barrel for adjusting an axial position of one of the lens groups relative to another lens group, said adjustment mechanism:
   an annular lens holding frame for fixedly holding the one lens group therein;
   a cylinder forming part of the lens barrel for holding said annular lens holding frame so as to allow said annular lens holding frame to shift in a direction of an optical axis of the optical lens system and to rotate about said optical axis; and
   position adjustment means provided between said annular lens holding frame and said cylinder for gradually varying an axial position between said annular lens holding frame and said cylinder;
   wherein said position adjustment means comprises an axial position selective collar with a flight of stairs formed thereon that extends circumferentially within said cylinder and gradually varies stepwise in said direction of said optical axis and locating means formed on an outer periphery of said annular lens holding frame for defining a reference face against which said stairs are selectively abutted to locate said annular lens holding frame in a selected axial position relative to said cylinder when said annular lens holding frame is rotated.

2. The adjustment mechanism as defined in claim 1, and further comprising bias means for pressing said annular lens holding frame against said cylinder through said position adjustment means.

3. The adjustment mechanism as defined in claim 1, wherein said locating means comprises a boss projecting in said direction of said optical axis and having an axial height greater than an overall axial interval between a top and a bottom stair of said flight of stairs.

4. The adjustment mechanism as defined in claim 3, wherein said locating means comprises three said projection arranged at regular angular intervals and said axial position selective collar comprises three said flights of stairs arranged at regular angular intervals.

5. The adjustment mechanism as defined in claim 4, wherein each adjacent two of said flights of stairs are bridged by a slop way.

6. The adjustment mechanism as defined in claim 1, wherein said cylinder holds said annular lens holding frame so as to allow said annular lens holding frame to move in a direction perpendicular to said optical axis.

7. A camera having a lens barrel equipped with the adjustment mechanism as set forth in claim 1.

* * * * *